United States Patent
Biermann et al.

(10) Patent No.: US 10,800,243 B2
(45) Date of Patent: Oct. 13, 2020

(54) ELECTROMECHANICAL DRIVE ASSEMBLY FOR A MULTITRACK MOTOR VEHICLE

(71) Applicant: Schaeffler Technologies AG & Co. KG, Herzogenaurach (DE)

(72) Inventors: Thorsten Biermann, Wachenroth (DE); Daniel Burghardt, Herzogenaurach (DE); Brian Lee, York, SC (US); Christopher Shamie, Brighton, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 82 days.

(21) Appl. No.: 16/148,372

(22) Filed: Oct. 1, 2018

(65) Prior Publication Data
US 2019/0105977 A1   Apr. 11, 2019

Related U.S. Application Data

(60) Provisional application No. 62/568,945, filed on Oct. 6, 2017.

(51) Int. Cl.
| | |
|---|---|
| *B60K 1/02* | (2006.01) |
| *B60K 17/04* | (2006.01) |
| *B60K 17/08* | (2006.01) |
| *B60K 7/00* | (2006.01) |
| *F16H 1/06* | (2006.01) |
| *F16H 1/28* | (2006.01) |
| *F16H 37/04* | (2006.01) |
| *H02K 7/00* | (2006.01) |
| *H02K 7/116* | (2006.01) |
| *B62D 55/06* | (2006.01) |

(52) U.S. Cl.
CPC .............. *B60K 1/02* (2013.01); *B60K 7/0007* (2013.01); *B60K 17/046* (2013.01); *B60K 17/08* (2013.01); *F16H 1/06* (2013.01); *F16H 1/28* (2013.01); *F16H 37/041* (2013.01); *H02K 7/006* (2013.01); *H02K 7/116* (2013.01); *B60K 2007/0061* (2013.01); *B62D 55/06* (2013.01)

(58) Field of Classification Search
None
See application file for complete search history.

(56) References Cited

U.S. PATENT DOCUMENTS

| | | | |
|---|---|---|---|
| 2006/0118344 A1* | 6/2006 | Rosch | B60K 7/0007 180/65.1 |
| 2008/0230289 A1* | 9/2008 | Schoon | F16H 57/0427 180/65.6 |

(Continued)

FOREIGN PATENT DOCUMENTS

| | | |
|---|---|---|
| DE | 102010010438 A1 | 9/2011 |
| DE | 102010017966 A1 | 10/2011 |

(Continued)

*Primary Examiner* — Justin Holmes
(74) *Attorney, Agent, or Firm* — Reid A. Baldwin

(57) ABSTRACT

An electromechanical drive assembly for a multitrack motor vehicle includes two electric motors, each with an associated reduction gear. The first and the second electric motor are arranged adjacent to one another and are, aligned transversely to the longitudinal direction of the motor vehicle. The first and the second reduction gear are connected on oppositely facing sides of the motors.

16 Claims, 2 Drawing Sheets

(56) References Cited

U.S. PATENT DOCUMENTS

| | | | | |
|---|---|---|---|---|
| 2011/0094807 A1* | 4/2011 | Pruitt | ................ | B60K 1/04 |
| | | | | 180/65.6 |
| 2011/0209934 A1* | 9/2011 | Armbruster | .......... | B60K 7/0007 |
| | | | | 180/65.25 |
| 2011/0259657 A1* | 10/2011 | Fuechtner | ................ | B60K 6/52 |
| | | | | 180/65.21 |
| 2012/0103708 A1* | 5/2012 | Hennings | ............. | B60K 7/0007 |
| | | | | 180/65.6 |
| 2014/0128194 A1* | 5/2014 | Mair | ................... | B60K 7/0007 |
| | | | | 475/149 |
| 2016/0039277 A1* | 2/2016 | Falls | ........................ | B60K 1/02 |
| | | | | 180/62 |

FOREIGN PATENT DOCUMENTS

| GB | 464500 A | 8/1934 | | |
|---|---|---|---|---|
| WO | WO-2009044603 A1 * | 4/2009 | ............. | F16D 55/40 |

\* cited by examiner

ELECTROMECHANICAL DRIVE ASSEMBLY FOR A MULTITRACK MOTOR VEHICLE

CROSS-REFERENCE TO RELATED APPLICATIONS

This application claims the benefit under 35 U.S.C. § 119(e) of U.S. Provisional Patent Application No. 62/568,945, filed Oct. 6, 2017, which application is incorporated in its entirety herein by reference.

TECHNICAL FIELD

The disclosure relates to an electromechanical drive assembly, for example, for a multitrack motor vehicle. The drive assembly may have a first electric motor having a first rotor, which revolves around a first rotor axis, a first reduction gear, which is driven by the first electric motor and which forms a first power output, which has a first gear output element, which rotates around a first gear output axis, a second electric motor having a second rotor, which revolves around a second rotor axis, and a second reduction gear, which is driven by the second electric motor and which forms a second power output, which has a second gear output element, which rotates around a second gear output axis.

BACKGROUND

Electric and hybrid electric vehicles utilize electric motors to provide some or all of the motive force to propel the vehicle. In some designs, the electric motor, the transmission, and other electronics may be combined in single unit called an "e-axle," which may directly drive the vehicle axle.

SUMMARY

It one object of the disclosure to provide an electromechanical drive assembly for a motor vehicle which is distinguished by a compact construction that can be achieved at low cost. According to the disclosure, this object may be achieved by an electromechanical drive assembly for a multitrack motor vehicle, having:
  a first electric motor having a first rotor, which revolves around a first rotor axis,
  a first reduction gear, which is driven by the first electric motor and which forms a first power output, which has a first gear output element, which rotates around a first gear output axis,
  a second electric motor having a second rotor, which revolves around a second rotor axis, and
  a second reduction gear, which is driven by the second electric motor and which forms a second power output, which has a second gear output element, which rotates around a second gear output axis, wherein
  the first and the second electric motor are arranged adjacent to one another,
  the first rotor axis and the second rotor axis are aligned transversely to the longitudinal direction of the motor vehicle, and
  the first and the second reduction gear are connected to the motor pair formed by the first and the second electric motor on oppositely facing sides of said pair.
The two reduction gears may be connected by side shafts to the wheels on a drive axle.

It is thereby advantageously possible to provide an electromechanical drive assembly for a motor vehicle in which both electric motors and gears can be arranged in close proximity and the reduction gears can be made partially symmetrical.

The concept according to the disclosure makes it possible to combine into one drive unit two gears which are provided axially between the vehicle wheels of a vehicle and are each driven by a dedicated electric motor.

By virtue of the installation space obtained in comparison with the conventional arrangement, the gears can be of virtually identical configuration, with the drives having the same power. In addition, the concept according to the disclosure allows active torque distribution and torque vectoring between the two driven wheels.

According to one embodiment of the disclosure, the drive assembly is constructed in such a way that the first electric motor has a first stator and the second electric motor has a second stator and that the first stator and the second stator are arranged offset relative to one another and radially in relation to the first rotor axis.

The drive assembly according to the disclosure may furthermore be constructed in such a way, for example, that the stators of the two electric motors are arranged in close proximity to one another. Furthermore, the drive assembly may be constructed in such a way, for example, that the first rotor axis and the second rotor axis are aligned parallel to one another.

The two reduction gears can be embodied as pure spur-wheel gears. However, it is also possible for each reduction gear to have an epicyclic gear and a gear train. Via the epicyclic gear, a preliminary conversion of the output power of the respective electric motor can be performed, and the gear train can then be used to bring about the offsetting of the axis of rotation of the gear output element relative to the rotor axis. Here, the epicyclic gear can comprise a sun wheel, which is driven directly by the rotor shaft of the first electric motor. The epicyclic gear can have a stationary annulus, and the power can be taken off via the planet carrier, for example, which then additionally carries a spur wheel of the gear train.

As an alternative, it is also possible to first bring about the offsetting of the input and output axes by a gear train, e.g. at least two spur wheels in engagement with one another, and then to bring about the final conversion to the output torque via the epicyclic gear. Here, the gear output element may once again be driven via the planet carrier.

The gear output elements can be designed as flange sections for the connection of wheel drive shafts, such as universally jointed shafts. The gear output elements can also be configured as plug-in connecting joints, which enable appropriately complementary sections of wheel drive shafts to be plugged in or on. The gear output elements can also form subsections of universal joints.

In one embodiment, the electromechanical drive unit according to the disclosure may furthermore be constructed in such a way that the first and the second gear output axis are aligned coaxially, e.g. are in alignment.

In the drive assembly, the two reduction gears can each form modular units, which are placed on the corresponding ends of the motor pair arranged adjacent along the longitudinal sides. Here, the electric motors can be accommodated in a common pot-type housing, and the housings of the reduction gears act as cover structures in this arrangement.

As an alternative, it is also possible to combine the first electric motor, the second electric motor, the first reduction gear and the second reduction gear into a modular unit, wherein the modular unit is configured in such a way here that it comprises a housing element which at least partially accommodates the first electric motor, the first reduction gear, the second electric motor and the second reduction gear. This housing element can be designed as a housing trough, into which the stators and gear devices are inserted from directions transverse to the respective rotor or gear axis. The configuration of a common cooling circuit for the two motors in a common housing part is generally advantageous.

The two electric motors may be designed as motors of equal power, for example, and have stators of identical construction and rotors of identical construction, for example.

The rotor axes of the two electric motors can be aligned in such a way that they are aligned perpendicularly to a vertical center plane extending in the longitudinal direction of the motor vehicle. A horizontal plane defined by the two rotor axes can be aligned parallel to the roadway or can slope slightly relative to the plane of the roadway in the unladen state of the motor vehicle.

BRIEF DESCRIPTION OF THE DRAWINGS

Further details and features of the disclosure will become apparent from the following description in conjunction with the drawing, in which.

DETAILED DESCRIPTION

Figure 1:
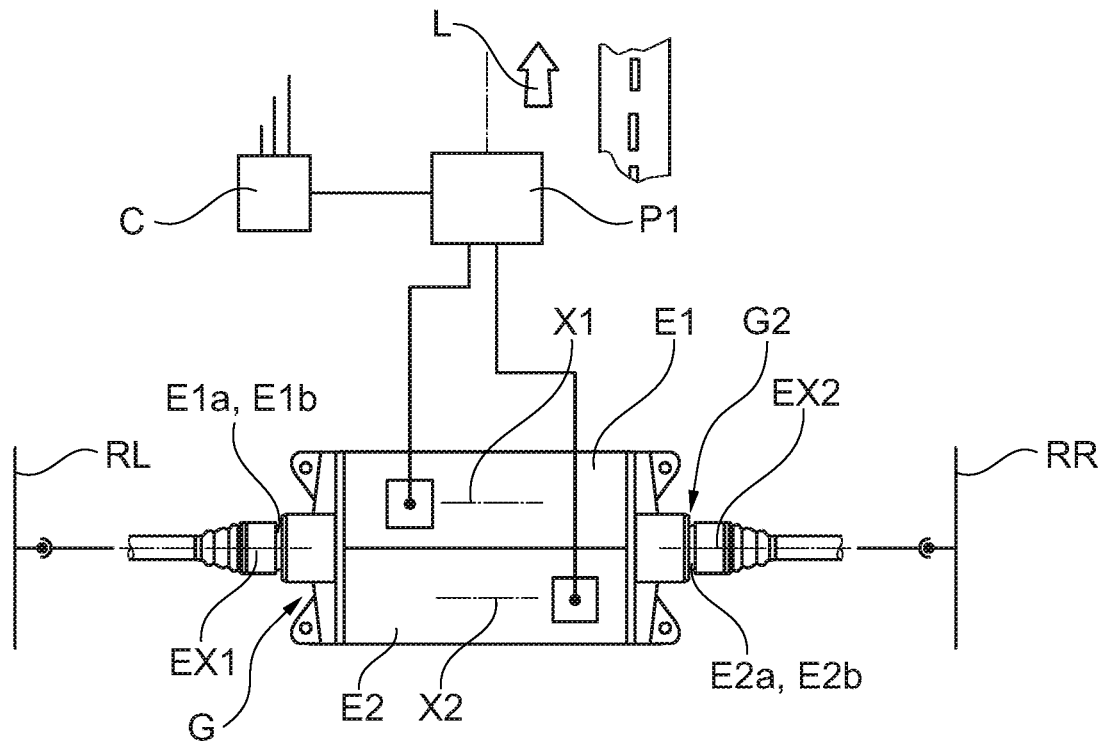
FIG. 1 shows a schematic diagram intended to illustrate the construction of an electromechanical drive assembly according to an embodiment of the disclosure, in particular a rear-axle drive assembly of a vehicle viewed in a direction normal, e.g. perpendicular, to a plane of a roadway.

The illustration according to FIG. 1 shows an illustrative embodiment of a first embodiment of an electromechanical drive assembly according to the disclosure for a multitrack motor vehicle. This drive assembly comprises a first electric motor E1 having a first rotor, which revolves around a first rotor axis X1, and a first reduction gear G1, which is driven by the first electric motor E1 and which forms a first power output E1a, which has a first gear output element E1b, which rotates about a first gear output axis EX1.

The drive assembly furthermore comprises a second electric motor E2 having a second rotor, which revolves around a second rotor axis X2, and a second reduction gear G2, which is driven by the second electric motor E2 and which forms a second power output E2a, which has a second gear output element E2b, which rotates around a second gear output axis EX2.

The drive assembly according to the disclosure is constructed in such a way that the first rotor axis X1 and the second rotor axis X2 are aligned transversely to the longitudinal direction L of the motor vehicle and the two electric motors E1, E2 are arranged adjacent to one another along the longitudinal sides thereof.

In the drive assembly shown here, the first rotor axis X1 and the second rotor axis X2 are furthermore aligned parallel to one another. In this embodiment, the first reduction gear G1 and the second reduction gear G2 are of identical construction and are placed against the motor pair on mutually opposite sides. The two reduction gear stages are designed in such a way that the two output axes EX1, EX2 are in alignment with one another, in particular in a center plane or plane of symmetry between the rotor axes X1, X2 of the two electric motors E1, E2.

The first reduction gear G1 and the second reduction gear G2 are each situated on the same side as the wheel RL, RR driven thereby. The gears G1, G2 are situated on mutually opposite sides of the two electric motors E1, E2.

The electromechanical drive assembly can be prefabricated as a wheel drive subassembly, which is inserted into a motor vehicle as a rear axle drive module or as a front axle drive module. In this case, it is possible, for example, for the drive assembly to form a drive module which can optionally be incorporated into a rear axle region of a passenger vehicle which furthermore has another drive, which drives the front axle of said vehicle, for example.

Where the drive assembly is used as a rear axle drive module, it can be coupled to the vehicle body via elastomeric mounts. The drive assembly can have attachment sections for the attachment of wheel suspension components, such as longitudinal, transverse or wishbone links.

The drive assembly can furthermore also be configured in such a way that it allows installation in combination with a rear axle of "de Dion" construction. In this case, the drive assembly is configured in such a way that it is situated in the interspace between the arms ("links") of this rear axle and, in this arrangement, the gear output axes EX1, EX2 are situated substantially at the longitudinal level of the rear wheel axes and vertically at the level of the rear wheel axes or slightly above this axis level.

The power supply to the two electric motors E1, E2 is accomplished by a power output stage P1. This power output stage P1 is controlled by an electronic control device C (e.g., controller). The electronic control device C may take into account numerous parameters relating to driving dynamics and, for example, can control the electric motors E1, E2 in such a way that they generate different drive torques, at least temporarily.

The application of power to the electric motors E1 and E2 may be accomplished by power output stages which are controlled according to the stipulations of an electronic control device. Here, control allows for a plurality of parameters relating to driving dynamics, for example, allowing for ESP and ABS parameters, in particular also the steering wheel angle and the steering torque. Here, the driving or, optionally, also braking torque applied to the respective wheel can be matched to the instantaneous driving state. The electric motors E1, E2 described here can also be operated temporarily in a recovery mode, in which they act as generators while building up a wheel braking torque.

According to another aspect of the present disclosure, it is also possible to construct the drive assembly in such a way that the drive systems for the left-hand and right-hand vehicle wheel, which can be operated independently of one another, can also be mechanically coupled by selective switching. Thus, it is possible to provide clutch devices which allow selectable coupling of the rotor shaft of the first electric motor E1 to the second gear G2.

In the illustrations described in accordance with FIGS. 1 to 4, the main components of the drive assembly are shown in the form of blocks and are joined together overall to form a rectangular block. The drive assembly according to the disclosure can be implemented as a substantially rectangular cuboid-like module but it is not restricted to such an overall configuration.

The first electric motor E1 and the second electric motor E2 are seated in an axially central position between the wheels RL, RR, for example. The overall center of gravity of the drive assembly is situated in the region of the vertical longitudinal center plane of the vehicle, for example. The position and configuration of the gear output elements E1$b$, E2$b$ is implemented in such a way that the kinematic coupling of the gear output elements E1$b$, E2$b$ to the wheels RL, RR can be accomplished by wheel drive shafts of identical construction.

It is also possible to incorporate braking mechanisms into the drive assembly to generate braking torques by friction, such as by disk or drum braking mechanisms situated in immediate proximity to the gear output elements.

Figure 2:
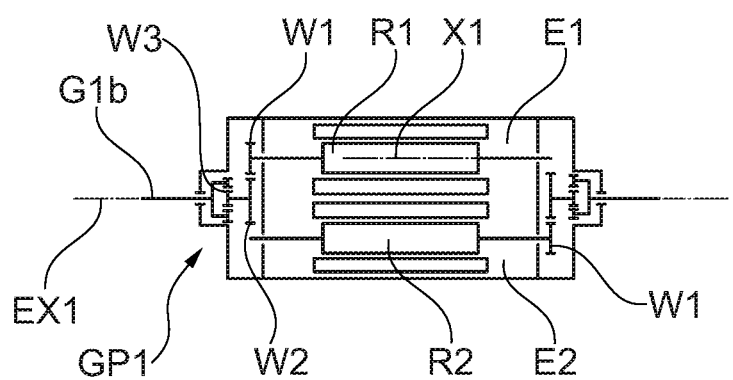
FIG. 2 shows a schematic diagram intended to illustrate the internal construction of the electromechanical drive assembly according to the embodiment of the disclosure shown in FIG. 1.

The illustration according to FIG. 2 illustrates the construction of the drive assembly according to FIG. 1 in a highly simplified form. In this embodiment, the rotor R1 of the first electric motor E1 drives a spur wheel W1, which is in engagement with a second spur wheel W2. The two spur wheels W1, W2 form a gear train, by which the offsetting of the rotor axis X1 relative to the output axis EX1 is achieved. Spur wheel W2 drives a sun wheel W3 of a planetary gear GP1, said sun wheel being coaxial with the output axis EX1. The power is taken off from the planetary gear GP1 via the planet carrier thereof, which is coupled for conjoint rotation to the gear output element G1$b$. Here, the annulus of the respective planetary stage is connected in a fixed manner to the housing.

The rotor R2 of the second electric motor E2 likewise drives a spur wheel W1, which is, in turn, in engagement with a spur wheel W2. While the offsetting of the axes X1/EX1 "from front to rear" is accomplished by gear G1, offsetting of the axes X2/EX2 "from the rear to the front" is accomplished by gear G2. However, the two gears G1, G2 can be of at least substantially identical construction, being mounted so as to be turned through 180° relative to one another.

Figure 3:
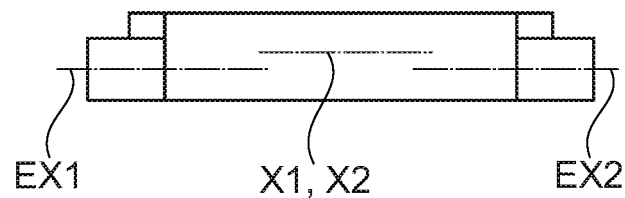
FIG. 3 shows a diagram intended to illustrate a variant having output axes which are offset vertically downward.

The illustration according to FIG. 3 shows an embodiment in which the output axes EX1, EX2 are offset downward relative to a plane defined by the rotor axes X1, X2. This form of construction creates a high ground clearance in the region of the electric motors E1, E2. This view is a view of the drive assembly from a direction parallel to the roadway and to the vertical vehicle longitudinal center plane. The distance between the output axes and the respective rotor axes, E1 to X1 and E2 to X2, is somewhat greater than half the distance between X1 and X2.

Figure 4:
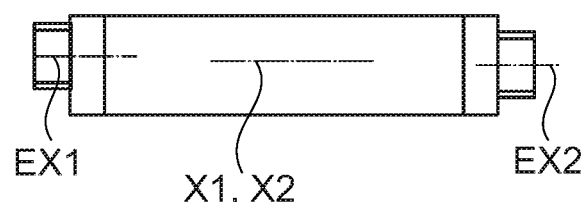
FIG. 4 shows a diagram intended to illustrate a variant in which the output axes extend in the plane defined by the rotor axes.

The illustration according to FIG. 4 shows an embodiment in which the output axes EX1, EX2 and the rotor axes X1, X2 are in a common plane. This form of construction creates a low center of gravity. This view is likewise a view of the drive assembly from a direction parallel to the roadway and to the vertical vehicle longitudinal center plane.

Figure 5:
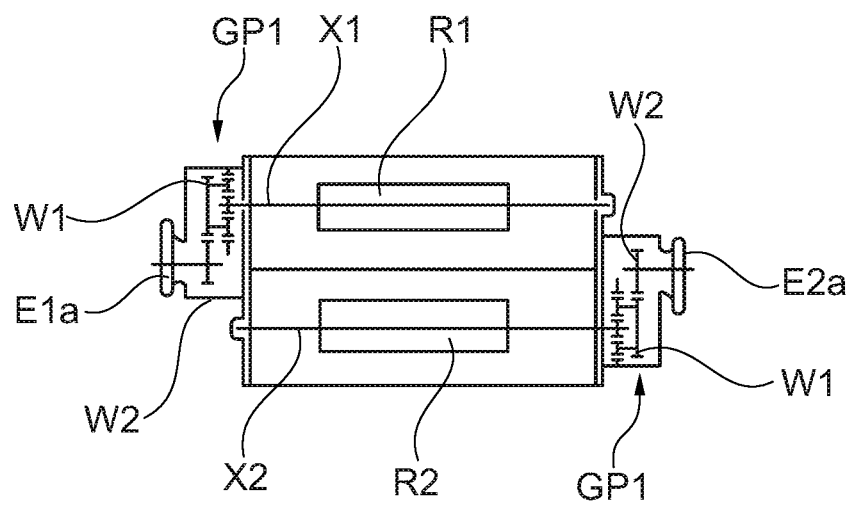
FIG. 5 shows a diagram intended to illustrate another variant, in which the output power of the respective motors is first passed via a planetary gear stage and the offsetting of the output axes relative to the rotor axes is brought about by a gear train after the preliminary conversion.

The illustration according to FIG. 5 shows another embodiment of a drive assembly according to the disclosure. As a departure from the embodiment described in connection with FIG. 2, the rotors R1, R2 here first of all each drive a preliminary stage GP1 embodied as an epicyclic gear, which then drives the respective power output E1$a$, E2$a$ via a spur wheel pair W1, W2. Here, the first spur wheel W1 is seated on the planet carrier of the epicyclic gear. The second spur wheel W2 is coupled for conjoint rotation to the power output E1$a$, E2$a$.

It is particularly clear in this illustration that the two gears G1, G2 can be of identical construction and are merely mounted so as to be "turned around". It is possible to match the external configuration of the gears G1, G2 in such a way that the asymmetry present here relative to the vertical vehicle longitudinal center planes is not externally apparent to this extent. In this illustrative embodiment, the center distance of the spur wheels W1, W2 corresponds to half the distance between the rotor axes X1, X2.

What is claimed is:

1. An electromechanical drive assembly for a multitrack motor vehicle, comprising:
    a first electric motor having a first rotor, which revolves around a first rotor axis;
    a first reduction gear, which is configured to be driven by the first electric motor and to form a first power output, which has a first gear output element, which rotates around a first gear output axis;
    a second electric motor having a second rotor, which revolves around a second rotor axis; and
    a second reduction gear, which is configured to be driven by the second electric motor and to form a second power output, which has a second gear output element, which rotates around a second gear output axis;
    wherein the first and second electric motors are arranged adjacent to one another, the first rotor axis and the second rotor axis are aligned transversely to a longitudinal direction of the motor vehicle, and the first and the second reduction gear are connected to a motor pair formed by the first and second electric motors on oppositely facing sides of said motor pair; and
    wherein the first rotor axis, first gear output axis, second rotor axis, and second gear output axis are coplanar.

2. The electromechanical drive assembly as claimed in claim 1, wherein the first rotor axis and the second rotor axis are aligned parallel to one another.

3. The electromechanical drive assembly as claimed in claim 1, wherein the first reduction gear comprises an epicyclic stage which is arranged coaxially with the first rotor axis.

4. The electromechanical drive assembly as claimed in claim 3, wherein the second reduction gear comprises an epicyclic stage which is arranged coaxially with the second rotor axis.

5. The electromechanical drive assembly as claimed in claim 1, wherein the first reduction gear comprises an epicyclic stage which is arranged coaxially with the first gear output axis.

6. The electromechanical drive assembly as claimed in claim 5, wherein the second reduction gear comprises an epicyclic stage which is arranged coaxially with the second gear output axis.

7. The electromechanical drive assembly as claimed in claim 1, wherein the first and the second reduction gear each comprise a spur-wheel or traction-means stage, via which an offsetting of the rotor axes relative to the gear output axes is accomplished.

8. The electromechanical drive assembly as claimed in claim 1, wherein the first and the second gear output axis are arranged in coaxial alignment.

9. The electromechanical drive assembly as claimed in claim 1, wherein the first electric motor, the second electric motor, the first reduction gear and the second reduction gear are combined into a modular unit.

10. The electromechanical drive assembly as claimed in claim 1, wherein the first reduction gear and the second reduction gear are of identical construction and are placed against corresponding ends of the motor pair in an alignment turned through 180° relative to one another.

11. The electromechanical drive assembly as claimed in claim 1, wherein an axis distance between the rotor axis and an associated gear output axis is greater than or equal to half a distance between the rotor axes.

12. The electromechanical drive assembly of claim 1 further comprising a housing including a housing trough into which the first electric motor, the first reduction gear, the second electric motor, and the second reduction gear are inserted from a direction traverse to the respective rotor or gear output axis.

13. An electromechanical drive assembly for a multitrack motor vehicle, comprising:
    a first electric motor having a first rotor, which revolves around a first rotor axis;
    a first reduction gear, which is configured to be driven by the first electric motor and to form a first power output, which has a first gear output element, which rotates around a first gear output axis;
    a second electric motor having a second rotor, which revolves around a second rotor axis;
    a second reduction gear, which is configured to be driven by the second electric motor and to form a second power output, which has a second gear output element, which rotates around a second gear output axis; and
    a housing including a housing through into which the first electric motor, the first reduction gear, the second electric motor, and the second reduction gear are inserted from a direction traverse to the respective rotor or gear output axis;
    wherein the first and second electric motors are arranged adjacent to one another, the first rotor axis and the second rotor axis are aligned transversely to a longitudinal direction of the motor vehicle, and the first and the second reduction gear are connected to a motor pair formed by the first and second electric motors on oppositely facing sides of said motor pair; and
    wherein the first reduction gear comprises an epicyclic stage which is arranged coaxially with the first gear output axis.

14. The electromechanical drive assembly as claimed in claim 13, wherein the first and the second gear output axis are arranged in coaxial alignment.

15. The electromechanical drive assembly as claimed in claim 13, wherein the first electric motor, the second electric motor, the first reduction gear and the second reduction gear are combined into a modular unit.

16. The electromechanical drive assembly as claimed in claim 13, wherein the first reduction gear and the second reduction gear are of identical construction and are placed against corresponding ends of the motor pair in an alignment turned through 180° relative to one another.

* * * * *